MODULATION SYSTEM

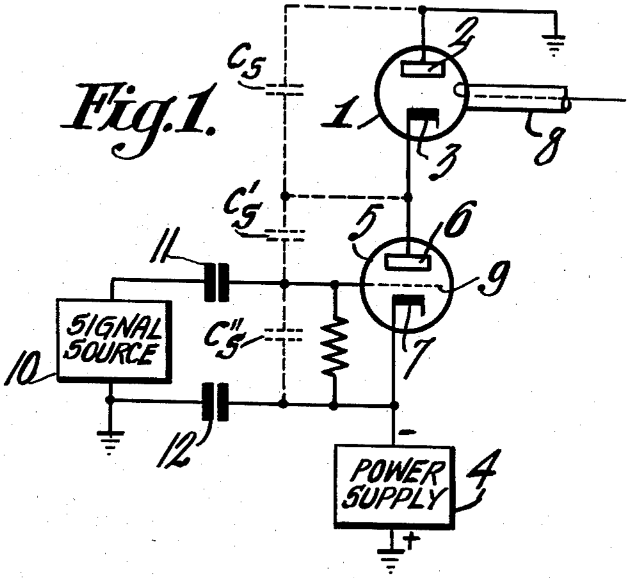
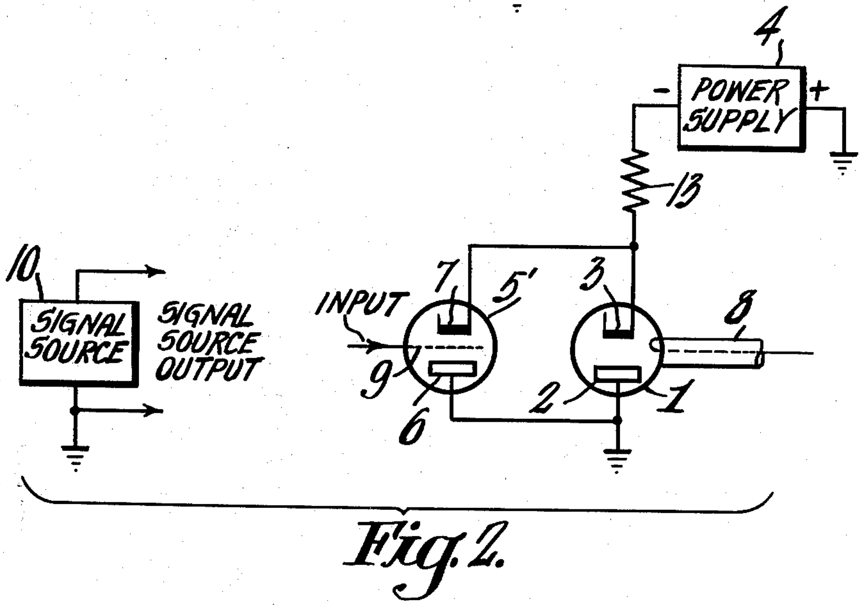
Fig. 2.
INVENTOR.
Peter Koustas
BY Charles H. Brown
ATTORNEY Feb. 7, 1961 P. KOUSTAS 2,971,168

Filed Dec. 28, 1954

2 Sheets-Sheet 2

INVENTOR.
Peter Koustas
BY Charles H. Brown
ATTORNEY 2,971,168
Patented Feb. 7, 1961

2,971,168

MODULATION SYSTEM

Peter Koustas, Belleville, N.J., assignor to Radio Corporation of America, a corporation of Delaware Filed Dec. 28, 1954, Ser. No. 478,025
15 Claims. (Cl. 332—5)

This invention relates to a modulation system, and more particularly to a modulation system useful in connection with magnesium oscillators.

Amplitude modulation of a magnetron oscillator may be accomplished in one of three ways. One of these ways is to operate the magnetron anode above ground or zero reference potential, with the magnetron anode modulated in a conventional manner. For this method of operation, the output circuit must be insulated, since the output transmission line is then operating at a high D.C. potential with respect to ground. This is quite undesirable, so much so in fact that in order to avoid having its output transmission line at a high potential with respect to ground, the magnetron is usually operated with its anode at ground or zero reference potential. This invention is concerned with a magnetron operating with its anode at ground potential.

Another way of accomplishing amplitude modulation of a magnetron oscillator is to run the magnetron anode at ground potential, with the modulator tube in series with the magnetron cathode, that is, in series between the magnetron cathode and the negative terminal of a source of unidirectional magnetron energizing potential. This makes it necessary to float the modulator tube at the magnetron cathode potential, or in other words, the anode and cathode potentials of the modulator tube must vary about the magnetron cathode D.C. potential. In this arrangement, it is difficult to couple the modulating signal into the modulator tube when one side of the driving or modulating signal source is at ground potential, as is usually the case. Special precautions must be taken in order to effect such coupling. Also, with such an arrangement it is impossible to achieve wide-band operation, due to unavoidable feedback through certain stray capacitances which cannot readily be eliminated.

The third way of accomplishing amplitude modulation of a magnetron oscillator might be to run the magnetron anode at ground potential, with the modulator tube in shunt to the anode-cathode path of the magnetron. However, practical shunt modulation of this type is not possible when one side of the driving signal source is at ground potential.

An object of this invention is to provide a novel arrangement for coupling an input signal, from a signal source having one side at ground potential, into a modulator which floats at a potential other than ground.

Another object is to provide a novel system for amplitude modulation of a magnetron oscillator operating with its anode at ground potential.

A further object is to devise a system for series modulation of a magnetron oscillator operating with a grounded anode, which eliminates the coupling difficulties present in prior systems and enables wide-band operation to be achieved.

A still further object is to devise a practical system for shunt modulation of a grounded-anode magnetron, with one side of the driving signal source at ground potential.

The objects of this invention are accomplished, briefly, in the following manner: modulating signals from a source of such signals, one side of which is grounded, are modulated onto VHF carrier wave energy and the modulated wave is applied by way of an inductive coupling to the input of a detector which detects the modulation frequency signals and thus becomes a new source of such signals. This detector can be readily operated at any D.C. level, such as the high negative potential on the cathode of a grounded-anode magnetron, and the output of the detector is applied between the cathode and grid of a modulator tube in order to amplitude modulate the magnetron. For series modulation, the anode-cathode path of the modulator tube may be connected in series between the magnetron cathode and the negative terminal of the power supply, while for shunt modulation the anode-cathode path of the modulator may be connected directly in shunt with the anode-cathode path of the magnetron itself.

The foregoing as well as other objects of the present invention will be better understood from the following description of some exemplifications thereof, reference being had to the accompanying drawings, wherein:

Fig. 1 is a schematic circuit diagram of a series modulation system for a grounded-anode magnetron according to the prior art;

Fig. 2 is a schematic circuit diagram of a shunt modulation system for a grounded-anode magnetron according to the prior art;

Figures 3, 4:
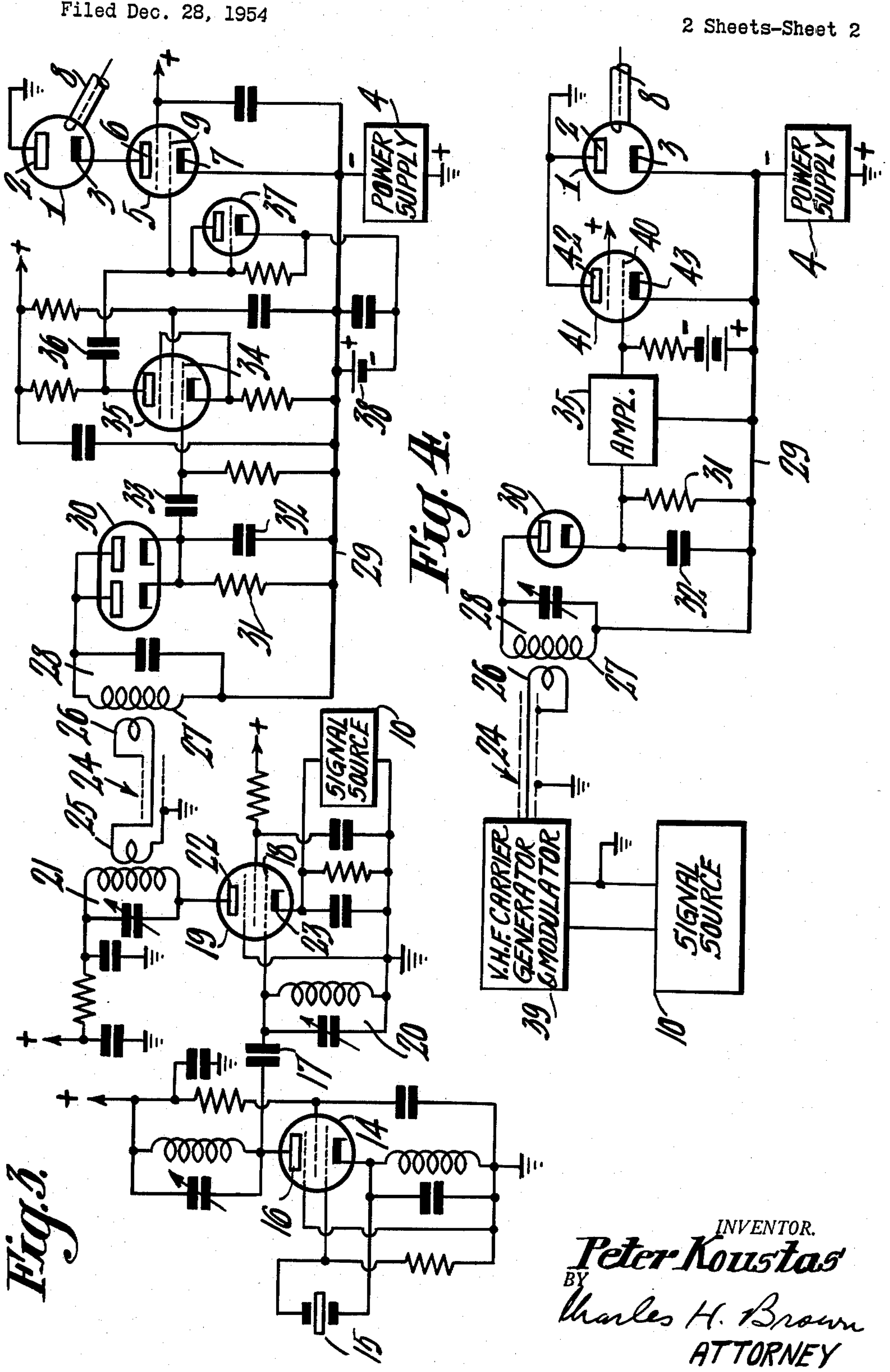
Fig. 3 is a detailed schematic circuit diagram of a series modulation system according to this invention.
Fig. 4 is a schematic circuit diagram of a shunt modulating system according to this invention.

Now referring to Fig. 1, this is a schematic circuit diagram of a typical series modulation circuit for a grounded-anode magnetron, according to the prior art. Magnetron 1 has an anode 2 and a cathode 3. Anode 2 is grounded and is thus connected to the postive terminal of a magnetron unidirectional power supply 4, the positive terminal of which is also grounded, as illustrated. The magnetron cathode 3 is connected in series with the anode-cathode path of a grid-controlled evacuated electron discharge device 5 (a triode), to the negative terminal of the power supply 4. More particularly, the magnetron cathode 3 is connected to the anode 6 of device 5, while the cathode 7 of device 5 is connected directly to the negative terminal of power supply 4.

The magnetron output transmission line 8 is directly connected to the anode (outer shell) of the magnetron 1, and thus must operate at the same D.C. potential (with respect to ground) as the anode. The inner conductor of line 8 is coupled to the oscillating field within the anode through a loop. To avoid having the line 8 at a high potential with respect to ground, magnetrons are customarily operated with their anodes at ground potential, as illustrated in Fig. 1.

Device 5 is arranged to operate as a series modulator for magnetron 1. Modulator 5 is connected in series in the cathode circuit of magnetron 1. Because the cathode 3, of necessity, is in the anode circuit of the magnetron, the modulator 5 is, in effect, in the anode-cathode circuit of magnetron 1.

As an example, the voltage of power supply 4 may be 2500 volts. When device 5 is operated as a modulator by applying a modulating signal to its control grid 9, the output signal of this modulator may be 200 volts peak-to-peak, so that the cathode 3 of the magnetron may have an operating potential of −2300 to −2500 volts with respect to the zero voltage level or ground, during modulation. This means that the modulator 5 must "float" at the magnetron cathode potential, which is a high negative potential with respect to ground, that is, both the anode 6 and the cathode 7 of the modulator 5 must "float" at a high negative potential with respect to ground.

When one side of the modulating signal source is at ground potential, as is almost always the case, it is difficult to couple the modulating signal into the modulator floating at the magnetron cathode potential (high negative potential with respect to ground). In order to couple the input or modulating signal from the modulating signal source 10 (which is operating at ground potential) into the modulator 5 which is floating at a potential other than ground (a high negative potential with respect to ground), capacitors 11 and 12 must be used in the coupling between source 10 and modulator 5. Capacitor 11 is connected between the ungrounded terminal of source 10 and grid 9, while capacitor 12 is connected between ground (the other terminal of source 10) and the cathode 7. The capacitors 11 and 12 allow coupling of the modulating signal from source 10 to modulator 5, while providing D.C. isolation of these units, one from the other, which latter is necessary because source 10 and modulator 5 float or operate about different D.C. potentials.

For wide-band operation, the capacitor 12 must provide a path of low impedance between cathode 7 and ground, for low frequency modulating signals, on the order of 30 c.p.s., for example, in order to complete the signal circuit. This means that this capacitor would have to be of large capacitance value to pass such low frequencies, and to withstand the high D.C. potential of power supply 4 it would have to be prohibitively large, both in cost and physical dimensions. Also, for high frequency modulating signals, such a large capacitor 12 would inherently provide too much series inductance on the cathode side of the modulator, while the capacitor 11 would inherently provide too much shunt capacitance on the grid side of the modulator. Thus, both the low frequency and high frequency limits of the band of modulating frequencies are very much reduced by the circuit of Fig. 1, and wide-band operation is almost impossible to achieve.

Also, in the circuit of Fig. 1, unavoidable stray capacitances $C_s$, $C_s'$ and $C_s''$, shown in dotted lines, exist. Because of unavoidable positive feedback through these stray capacitances, it is extremely difficult to prevent parasitic oscillations from arising in the Fig. 1 system. In other words, it is difficult to prevent oscillations from being set up in the modulator 5 itself.

It may therefore be seen that the system of Fig. 1 has several disadvantages or drawbacks. The present invention overcomes these disadvantages, as will hereinafter appear.

The remaining known possibility for modulation of a grounded-anode magnetron involves shunt modulation, and a proposed shunt modulation scheme is illustrated in Fig. 2. The magnetron anode 2 is again grounded, as is the positive terminal of power supply 4, while the magnetron cathode 3 is connected through a resistor 13 to the negative terminal of unit 4. The modulator discharge device 5' (e.g., a triode vacuum tube as in Fig. 1) is connected in shunt to magnetron 1, that is, the anode 6 of the modulator is connected to the anode 2 of the magnetron which anode is connected to ground, while the cathode 7 of the modulator is connected to the cathode 3 of the magnetron. Again, the modulating signal source 10 has one terminal at D.C. ground potential, as in Fig. 1. For proper operation of the modulator tube 5', the input (modulating) signal for this tube should be injected between the grid 9 and cathode 7 thereof, in accordance with the usual requirement for the input connections to vacuum tubes. However, this is impractical to do in Fig. 2, wherein the signal source 10 is operating around ground potential while the cathode 7 of the modulator is not grounded but is at a high negative potential with respect to ground. In other words, it is impractical to apply the modulating signal to the modulator when the polarity of the modulating signal source 10 and that of the modulator tube 5' are reversed with respect to ground.

Thus, according to the prior art, shunt modulation of a grounded-anode magnetron is not practical when the modulating signal source is operating at ground potential. The present invention allows shunt modulation of a grounded-anode magnetron to be accomplished.

The present invention operates, basically, to produce the same effect as if the modulating signals were generated at the same D.C. potential as that at which the modulator is operating. In this way, the disadvantages and drawbacks present in the prior art systems are eliminated.

Referring to Fig. 3 which is a circuit arrangement of a series modulation circuit for a grounded-anode magnetron according to this invention, a pentode vacuum tube 14 is connected into a circuit which operates as a crystal oscillator stabilized infrequency by means of a piezoelectric crystal 15 connected between the control grid and cathode of tube 14. The oscillator tube 14 serves as a source of carrier frequency energy in the VHF range, for example at 34 megacycles (mc.), and energy of this frequency appears at the anode 16 of tube 14 and is coupled by means of a capacitor 17 to the control grid 18 of a pentode vacuum tube 19 connected to operate as an amplifier and frequency doubler. An LC parallel resonant circuit 20 tuned to 34 mc. is connected from control grid 18 to ground, while an LC parallel resonant circuit 21 tuned to 68 mc. is connected to anode 22 of tube 19, between said anode and the positive terminal of a unidirectional potential source denoted by +.

The tube 19 also serves as a modulated stage, in which amplitude modulation of the VHF carrier is effected. The modulating signal source 10, which has one output terminal grounded and which therefore operates or floats at ground potential, is connected between the cathode 23 of tube 19 and ground. Thus, this source is in the anode-cathode circuit of tube 19 and may be considered to operate by varying or modulating the anode potential of this tube. The source 10 of modulating signals may be any suitable low impedance signal source. By way of example, for test purposes a laboratory-type sine wave generator or pulse generator may be used at 10. In actual commercial service, a source of audio signals, or a source of video signals, or any other intelligence-bearing signal source, could be used at 10. By means of the circuit arrangement described, the VHF carrier generated in tube 14 and applied to grid 18, is doubled in frequency and appears as an amplitude modulated 68-mc. VHF carrier in the tuned anode circuit 21. In other words, in this system the modulation signal from source 10 is used to modulate a VHF carrier. The elements 14—23 constitute a more or less conventional low power transmitter the output frequency of which may be approximately 68 mc.

The modulated VHF carrier appearing in circuit 21 is coupled to the magnetron modulator portion of the Fig. 3 circuit by means of a suitable coupling link generally indicated by numeral 24. Link 24 may consist of a length of coaxial cable having one or more turns at each end thereof, with the turns 25 at one end inductively coupled to the inductance of circuit 21. The outer conductor of the cable is grounded as indicated, and the turns 26 at the opposite end of the link or cable 24 are inductively coupled to the inductance 27 of an LC parallel resonant input circuit 28 which may be tuned to the VHF carrier frequency of 68 mc. The amplitude modulated 68-mc. carrier frequency then appears in circuit 28. One side of the circuit 28 is connected to a bus 29 which is in turn connected to the negative terminal of the magnetron power supply 4, the positive terminal of which is grounded. The bus 29, for example, may thus operate at about 2000 volts negative with respect to ground. About 5000 volts of insulation is provided between the turns 26 and the inductance 27. Since the couplings at opposite ends of link 24 are only inductive, there are no D.C. couplings between the signal source 10 and the modulator portion of the Fig. 3 circuit, and these may therefore operate at widely different D.C. potentials with respect to ground. That is, the "reference" 29 for the modulator is at a high negative potential with respect to ground, while the reference for signal source 10 is at zero or ground potential. The signal source 10 and the modulator portion of Fig. 3 then "float" at different potentials.

The side of circuit 28 opposite to "reference" bus 29 is connected to both anodes of a double diode vacuum tube 30, for example a type 6AL5 tube, connected to act as a detector of the modulation frequency signals borne by the modulated carrier appearing in circuit 28. The modulation frequency signals appear across a load resistor 31 connected between both cathodes of tube 30 and bus 29, a capacitor 32 being connected across resistor 31. The modulation frequency signals detected by detector 30 are applied through a coupling capacitor 33 to the control grid 34 of a pentode vacuum tube 35 connected to operate as an amplifier. Tube 35 amplifies the (detected) modulation frequency signals to the level required to modulate the magnetron 1, and the amplified modulation frequency signals appearing at the anode of tube 35 are applied through a coupling capacitor 36 to the control grid 9 of a vacuum tetrode series modulator tube 5. The anode-cathode path of tube 5 is connected in series between the magnetron 1 and the magnetron power supply 4. Thus, the magnetron anode 2 is grounded and the magnetron cathode 3 is connected directly to modulator tube anode 6, while the cathode 7 of the modulator tube 5 is connected to the bus 29 and the negative terminal of power supply 4. The modulation frequency signals applied to control grid 9 of the series modulator tube 5 cause anode modulation of the magnetron 1 to be effected, the magnetron 1 thereby being amplitude modulated in response to such modulation frequency signals.

A diode-connected triode vacuum tube 37 serves as a clamp tube, to clamp the signal level at grid 9 to a certain bias voltage. The anode and grid of triode 37 are connected to grid 9, while the cathode of tube 37 is connected through a suitable source of bias potential, represented by a battery 38, to bus 29.

In the system of this invention, the output of the detector 30 serves as a new source of modulation frequency signals operating or "floating" at the modulator potential, that is, at the high negative potential (with respect to ground) of the "reference" bus 29, even though the original signal source 10 is floating at ground potential. In other words, the same effect is produced as if the modulation frequency signals were generated at the modulator reference potential, the potential of bus 29. This is possible because there is no D.C. coupling between source 10 and the modulator, in the system of Fig. 3.

In Fig. 3, the effect of the stray capacitances (in the production of parasitic oscillations) is reduced, as compared to Fig. 1, because of the elimination of the physically large blocking or isolating condensers 11 and 12 between the signal source and the modulator. The feedback problems are not nearly so acute in the Fig. 3 system as in the Fig. 1 system, and the feedback paths between the magnetron and the signal source are virtually eliminated in the system of Fig. 3, due to the inductive coupling link 24 utilized therein.

In Fig. 3, the signal circuit is complete without any bypassing capacitor between the signal source ground and the modulator cathode 7. Therefore, the prohibitively large high-capacitance, high-voltage coupling capacitor 12, which is necessary in Fig. 1 for passing low frequencies, is entirely eliminated in Fig. 3. Thus, a physically very large and very expensive component is eliminated in the Fig. 3 system. Also, because the capacitors 11 and 12 are eliminated in the system of Fig. 3, the bandwidth limitations of the Fig. 1 system are done away with and wide-band operation can easily be achieved in Fig. 3.

According to this invention, shunt modulation of a grounded-anode magnetron is possible when the signal source is operating at ground potential, this being impractical with the prior art system of Fig. 2, as previously discussed. Fig. 4 discloses a shunt modulation system according to this invention. In Fig. 4, the VHF carrier generator and modulator 39 corresponds in circuitry to that illustrated in Fig. 3 and consisting of elements 14–23, inclusive, this modulator causing amplitude modulation of the VHF carrier wave by the modulation frequency signal source 10. The amplitude modulated signal is coupled by way of link 24 into resonant circuit 28 and is detected (to derive therefrom the modulation frequency signal itself) by means of diode 30. The detected modulation frequency signal is amplified by an amplifier 35 to a level sufficient to modulate the magnetron 1, this amplifier being similar to amplifier 35 of Fig. 3.

The amplified modulation frequency signal is applied from the output of amplifier 35 to the control grid 40 of a tetrode vacuum tube 41 serving as a shunt modulator for magnetron 1. As in Fig. 3, the positive terminal of magnetron power supply 4 is grounded, as is the anode 2 of the magnetron, while the negative terminal of power supply 4 is connected to bus 29, so that this bus is at a high negative potential with respect to ground. In Fig. 4, the cathode 3 of the magnetron is connected directly to bus 29, while the modulator cathode 43 is connected to this same bus. To complete the shunt modulator circuit, the anode of the modulator 42 is connected to the magnetron anode 2 or ground.

In Fig. 4, as in Fig. 3, a reference plane at high potential (the potential of bus 29) with respect to ground is established for the modulating signal, since the detector 30 (which provides the modulation frequency signal at its output) and the amplifier 35 are both operating at the high potential reference plane, the potential of bus 29. Thus, the modulating signal can readily be injected into the modulator tube 41 between the grid 40 and the cathode 43 thereof, since cathode 43 also operates at the same high potential reference plane (bus 29). Shunt modulation of a grounded-anode magnetron is thus readily feasible, using the system of Fig. 4, even though the modulating signal source 10 is operating at ground potential.

What is claimed is:

1. A magnetron modulation system comprising a magnetron oscillator having an anode and a cathode defining a space therebetween in which oscillations are developed, means coupling said anode to a point of zero reference potential, an electron discharge device having at least an anode, a cathode and a control electrode, means coupling the anode-cathode path of said device to said magnetron cathode to modulate the voltage of said magnetron cathode about a negative unidirectional potential point in response to signals applied to said control electrode, a source of modulating signals, means coupled to the output of said source for modulating output signals from said source onto a carrier to produce a modulated wave, a detector having an input and an output, means for applying said modulated wave to the detector input; and means coupling the detector output to said control electrode.

2. A system in accordance with claim 1, wherein one terminal of said source is connected to said zero reference potential point.

3. A system in accordance with claim 1, wherein the modulated wave is applied to the detector input through a connection incapable of passing direct current.

4. A system in accordance with claim 3, wherein the said connection includes an inductive coupling.

5. A system in accordance with claim 1, wherein one terminal of said source is connected to said zero reference potential point, and wherein the modulated wave is applied to the detector input by way of an inductive coupling.

6. A magnetron modulation system comprising a magnetron oscillator having an anode and a cathode defining a space therebetween in which oscillations are developed, means coupling said anode to a point of zero reference potential, an electron discharge device having at least an anode, a cathode and a control electrode, means coupling the anode-cathode path of said device in series between said magnetron cathode and the negative terminal of a unidirectional potential source whose positive terminal is connected to the anode of said magnetron, a source of modulating signals, means coupled to the output of said last-named source for modulating output signals from said last-named source onto a carrier to produce a modulated wave, a detector having an input and an output, means for applying said modulated wave to the detector input, and means coupling the detector output to said control electrode.

7. A system in accordance with claim 6, wherein one terminal of the modulating signal source is connected to said zero reference potential point.

8. A system in accordance with claim 6, wherein the modulated wave is applied to the detector input through a connection incapable of passing direct current.

9. A system in accordance with claim 8, wherein the said connection includes an inductive coupling.

10. A system in accordance with claim 6, wherein one terminal of the modulating signal source is connected to said zero reference potential point, and wherein the modulated wave is applied to the detector input by way of an inductive coupling.

11. A magnetron modulation system comprising a magnetron oscillator having an anode and a cathode defining a space therebetween in which oscillations are developed, means coupling said anode to a point of zero reference potential, an electron discharge device having at least an anode, a cathode and a control electrode, means coupling the anode-cathode path of said device across the anode-cathode path of said magnetron, means coupling the cathode of said magnetron to the negative terminal of a unidirectional potential source, a source of modulating signals, means coupled to the output of said last-named source for modulating output signals from said last-named source onto a carrier to produce a modulated wave, a detector having an input and an output, means for applying said modulated wave to the detector input, and means coupling the detector output to said control electrode.

12. A system in accordance with claim 11, wherein one terminal of the modulating signal source is connected to said zero reference potential point.

13. A system in accordance with claim 11, wherein the modulated wave is applied to the detector input through a connection incapable of passing direct current.

14. A system in accordance with claim 13, wherein the said connection includes an inductive coupling.

15. A system in accordance with claim 11, wherein one terminal of the modulating signal source is connected to said zero reference potential point, and wherein the modulated wave is applied to the detector input by way of an inductive coupling.

References Cited in the file of this patent

UNITED STATES PATENTS 2,490,007 Peters ---------------- Nov. 29, 1949

UNITED STATES PATENT OFFICE
CERTIFICATE OF CORRECTION

Patent No. 2,971,168 February 7, 1961

Peter Koustas

It is hereby certified that error appears in the above numbered patent requiring correction and that the said Letters Patent should read as corrected below.

Column 1, line 17, for "magnesium" read -- magnetron --.

Signed and sealed this 3rd day of October 1961.

(SEAL)
Attest:

ERNEST W. SWIDER
Attesting Officer

DAVID L. LADD
Commissioner of Patents

USCOMM-DC